United States Patent [19]
Chen et al.

[11] Patent Number: 5,902,928
[45] Date of Patent: May 11, 1999

[54] CONTROLLING ENGAGEMENT OF A SCANNING MICROSCOPE PROBE WITH A SEGMENTED PIEZOELECTRIC ACTUATOR

[75] Inventors: Dong Chen; Edwin Flecha; James Michael Hammond; Kenneth Gilbert Roessler, all of Boca Raton, Fla.

[73] Assignee: International Business Machines Corporation, Armonk, N.Y.

[21] Appl. No.: 08/867,138

[22] Filed: Jun. 2, 1997

[51] Int. Cl.⁶ .................................................. G01B 7/34
[52] U.S. Cl. .......................... 73/105; 250/306; 310/354
[58] Field of Search ............................... 73/105; 250/306, 250/307; 310/354

[56] References Cited

U.S. PATENT DOCUMENTS

| | | | |
|---|---|---|---|
| Re. 34,331 | 8/1993 | Elings et al. | 250/306 |
| 4,343,993 | 8/1982 | Binning et al. | 250/306 |
| 4,724,318 | 2/1988 | Binning | 250/306 |
| 4,841,148 | 6/1989 | Lyding | 250/306 |
| 5,001,409 | 3/1991 | Hosaka et al. | 250/306 X |
| 5,173,605 | 12/1992 | Hayes et al. | 250/306 |
| 5,198,715 | 3/1993 | Elings et al. | 310/328 |
| 5,376,390 | 12/1994 | Linker et al. | 250/306 |
| 5,388,452 | 2/1995 | Harp et al. | 73/105 |
| 5,414,690 | 5/1995 | Shido et al. | 369/126 |
| 5,415,027 | 5/1995 | Elings etal. | 73/105 |
| 5,436,448 | 7/1995 | Hosaka et al. | 250/306 |
| 5,627,365 | 5/1997 | Chiba et al. | 73/105 X |

FOREIGN PATENT DOCUMENTS

| | | | |
|---|---|---|---|
| 4-318404 | 11/1992 | Japan | G01B 7/34 |
| 7-134133 | 5/1995 | Japan . | |

OTHER PUBLICATIONS

Patent Abstracts of Europe (EP 00622652A1) Nov. 2, 1994 "Scanning near–field optic/latomic–force microscope, probe for use in same, and method of fabricating said probe" Muramatsu et al.

*Primary Examiner*—Thomas P. Noland
*Attorney, Agent, or Firm*—Richard A. Tomlin; Ronald V. Davidge

[57] ABSTRACT

A scanning probe microscope includes a segmented piezoelectric actuator having a course segment and a fine segment, the outputs of which are combined to determine the movement of a distal end of the actuator, to which the probe is mechanically coupled. Movement of the probe tip, or a change in the level of its engagement with a sample surface is sensed by a detector, which generates a feedback signal. A correction signal, which is used to determine how the actuator should be moved to maintain a constant level of such engagement, is generated in a comparison circuit, which compares the feedback signal with a control signal. The correction signal is used to drive the fine segment of the actuator, while an integral of the correction signal is used to drive the coarse segment.

17 Claims, 4 Drawing Sheets

CONTROLLING ENGAGEMENT OF A SCANNING MICROSCOPE PROBE WITH A SEGMENTED PIEZOELECTRIC ACTUATOR

CROSS-REFERENCE TO RELATED APPLICATIONS

This application is related to a copending U.S. application Ser. No. 08/867,137, filed Jun. 2, 1997 entitled "Detecting Fields with a Two-Pass, Dual-Amplitude-Mode Scanning Force Microscope," Docket No. BC9-97-006, entitled "Detecting Fields with a Two-Pass, Dual Amplitude Mode Scanning Force Microscope," Docket No. BC9-97-006, having a common assignee herewith, and filed on an even day herewith, which is hereby incorporated herein by reference, This application is also related to a copending U.S. application Ser. No. 08/867,136, filed Jun. 2, 1997 entitled "Detecting Fields with a Single-Pass, Dual-Amplitude-Mode Scanning Force Microscope," Docket No. BC9-97-009, having a common assignee herewith, filed on an even day herewith, which is hereby incorporated herein by reference.

These copending applications describe the use of a segmented piezo-electric actuator to move the probe in a scanning probe microscope for the measurement of both sample surface topography and magnetic or electric fields extending outward from the sample surface.

BACKGROUND OF THE INVENTION

1. Field of the Invention

This invention relates to a method for controlling the engagement of a probe within a scanning probe microscope, and, more particularly, to controlling a segmented piezoelectric actuator so that a first segment of the actuator responds to changes in the distance between the probe tip and the sample surface which occur rapidly as the sample is traversed by the probe during the scanning process, while a second segment of the actuator responds to changes in the distance between the probe tip and the sample surface which occur slowly as the sample surface is traversed by the probe during the scanning process.

2. Background Information

Conventional scanning probe microscopes employ a single piezoelectric actuator to move the probe in the engagement direction, which is often called the vertical or z-direction. Such devices often encounter a problem associated with an inability to obtain a very high digital bit resolution of the actuator movement together with a suitably large dynamic range of movement. For a particular piezoelectric material, the maximum dynamic range which can be achieved is determined by the piezo constant, C, expressed in Angstroms/Volt, and the maximum operational voltage, $V_{max}$. The bit resolution, in Angstroms/bit is given by the following expression:

$$R = \frac{V_{max} C}{N}$$

In this expression, R is the bit resolution, and N is the bit count. For example, if the digital signal generated within a computing device is fed through a 16-bit digital to analog converter in order to generate the analog signal needed to drive the actuator, the bit count is 65,535.

What is needed is a way to obtain high resolution without sacrificing the vertical (engagement) probe travel needed in many applications.

3. Description of the Prior Art

The patent art includes a number of patents, such as U.S. Pat. Nos. 4,343,993 and 4,724,318, describing scanning probe microscope technologies in which the present invention can be applied.

U.S. Pat. No. 4,343,993 describes a scanning tunneling microscope, in which a very sharp metal tip is raster-scanned across a surface to be inspected at a distance so small that the electron clouds of the atoms at the apex of the tip and on the surface area closest to the tip gently touch. A so-called tunnel current then flows across the gap, provided a potential difference exists between the tip and the surface. Since, this tunnel current is exponentially dependent on the distance between the tip and the surface, a correction signal is generated, based on deviations from a predetermined value occurring as the tip is scanned across the surface of the probe. The correction signal is used to control the tunnel distance so as to maximize the correction signal, and to be plotted versus a position signal derived from the physical position of the tip over the surface being inspected. This technique permits a resolution down to an atomic scale, so that individual atoms on the surface can be made visible.

U.S. Pat. No. 4,724,318 describes an atomic force microscope, in which a sharp point is brought so close to the surface of a sample to be investigated that the forces occurring between the atoms as the apex of the point and those at the surface cause a spring-like cantilever to deflect. The cantilever forms one electrode of a tunneling microscope, the other electrode being a sharp tip. The deflection of the cantilever provokes a variation of the tunnel current, and that variation is used to generate a correction signal which can be employed to control the distance between the point and the sample, in order, for example, the force between them constant as the point is scanned across the surface of the sample by means of an xyz-drive, with the sample being driven in a raster scan in the xy-plane. In certain modes of operation, either the sample or the cantilever may be excited to oscillate in the z-direction. If the oscillation is at the resonance frequency of the cantilever, the resolution is enhanced. Using this method, a topographical image of a sample surface having a resolution better than 100 nanometers may be obtained by employing the following steps: A sharp point which is fixed to one end of a spring-like cantilever is brought so close to the surface of the sample to be inspected that the forces occurring between the point and the sample surface are larger than $10^{-20}$ Newton, so that the resulting force deflects the cantilever. The deflection of the cantilever is detected by means of a tunnel tip disposed adjacent the cantilever. The tunnel current then flowing across the gap between the cantilever and tunnel tip is maintained at a constant value by using any detected variations of the tunnel current to generate a corrections signal. The correction signal is used, among other things, to maintain the point-to-sample distance constant.

While the abovementioned U.S. Patents provide descriptions of methods for using a scanning probe to develop data describing the surface of a test sample, the use of dual actuators to derive the benefits of relatively large movements with a slow actuator and of speed and accuracy with a fast actuator is not described. Thus, what is needed is a dual actuator system including a suitable control scheme for dividing required movements between the two actuators.

Other examples from the Patent Art, such as U.S. Pat. No. 5,414,690 and Japanese patent Kokai No. 4-318404, describe methods to move a scanning probe attached to a fine movement actuator which is, in turn, fastened to a course movement actuator.

U.S. Pat. No. 5,414,690 describes a method for moving a probe in a direction perpendicular to the surface of a sample by means of a fine movement section attached to the probe and a course movement section attached to the fine movement section. The fine movement section uses, for example, a piezo-electric actuator, while the course movement section is movable over a wide range by the use, for example, of a stepping motor.

Japanese patent Kokai No. 4-318404 describes a method enabling a probe to trace the surface of a sample, even if the surface is greatly "rough," by interlocking the movement of a fine adjustment mechanism and a coarse adjustment mechanism, based on the minute displacement state of the probe in an approaching/separating direction to the sample. A tunnel current detector detects a tunnel current, which starts to flow when a probe approaches the surface of the sample, within an atomic-level distance. This current is fed as an input signal to a fine adjustment mechanism control device, which in turn supplies an instruction signal to the fine adjustment mechanism. A device for detecting and evaluating the state of the fine adjustment mechanism receives positional data in the z-axis direction of the probe input from the fine adjustment mechanism control device, compares this data with reference data, and activates a course adjustment mechanism control device when it judges that the position of the probe cannot be changed as required only by a shift through the fine adjustment. When a course adjustment mechanism is to be driven, the course adjustment mechanism control device supplies an instruction signal, as necessary, the fine adjustment mechanism control device, so that a required adjustment to the probe position is executed.

While these examples of the prior art provide for the use of a pair of actuators to perform fine and course movements, they do not operate in a manner dividing the total motion into fast and slow components. What is needed is a method dividing the motion in this way, so that a broad range of slow movement can be allowed without compromising the resolution provided for fine movements.

The segmentation of tubular piezoelectric actuators, allowing the application of various driving signals to electrodes extending along various portions the surfaces of an individual actuator to obtain specific patterns of movement upon the application of driving signals among the electrodes. In examples described by Roland Wiesendanger in *Scanning Probe Microscopy and Spectroscopy—Methods and Applications*, Cambridge University Press, pp. 94–95, 1994, a piezoelectric tube actuator consists of a tubular section of piezoelectric material having an inner electrode extending along its inner surface and a segmented outer electrode extending along its outer surface. Each segment of the outer electrode extends longitudinally along its surface. As a voltage is applied to a single outside electrode, the tube bends away from that electrode. A voltage applied to the inner electrode causes a uniform elongation. For example, a small AC signal and a large DC offset can be applied separately to electrodes spaced 180-degrees apart.

Alternately the outer electrode is sectioned into four equal areas parallel to the axis of the tube. The tube is fixed at one end, and a probe is mounted at the opposite end to extend in a direction parallel with the axis of the tube. Pairs of opposite outer electrode segments are then excited by a voltage leading to bending motions of the tube, so that X- and Y-direction scanning motions of the probe occur.

Japanese Pat. Kokai No. 7-134133 also describes several versions of a tubular piezoelectric actuator having electrode segments extending along its outer surface. This actuator is also divided transversely into tubular sections having individual outer electrode segments.

While these references describe the construction of segmented tubular actuators, they do not address a method for causing these segments to respond respectively to a coarse portion of a driving signal and the remaining portion of the driving signal. Furthermore, this segmentation is applied to a tubular actuator. What is needed is the application of segmentation to a cantilever bimorph actuator, in which rapid movement can occur through simple bending, without the twisting distortion occurring in the walls of a tubular actuator.

SUMMARY OF THE INVENTION

It is a first object of the present invention to provide a scanning probe microscope having a coarse actuator driving the probe therein through relatively large, but slowly occurring movements, and a fine actuator driving the probe movements which are relatively small in amplitude but rapid in occurrence, so that the sum of movements of the probe due to both coarse and fine actuators.

It is a second object of the present invention to provide a means for separating a relatively large, but slowly occurring component of an actuator drive signal from the total signal, so that this component of the signal can be used for driving a coarse actuator.

It is a third object of the present invention to provide a scanning probe microscope in which a first component of vertical actuator movement, including relatively large, but slowly occurring movements, is represented by a first encoded signal, while a remaining component of vertical actuator movement is represented by a second encoded signal, so that the second encoded signal has a much finer resolution than the first encoded signal.

It is a fourth objective of the present invention to provide a piezoelectric actuator having a course segment with a relatively large deflection per volt and a fine segment with a relatively small deflection per volt.

It is a fifth objective of the present invention to provide a piezoelectric actuator having two segments to which different voltage signals are applied while effects of incompatible strain conditions between the two segments are minimized.

According to one aspect of the present invention, there is provided apparatus including signal processing means, coarse actuation means, fine actuation means, and feedback means. The signal processing means forms a coarse drive signal by integrating a correction signal. The coarse actuation means is driven in response to the coarse drive signal. The fine actuation means is driven in response to the correction signal. An actuation output point is moved in a first direction in response to a sum of the motion of the coarse and fine actuation means, with the coarse actuation means moving the actuation output point through a greater distance range than the fine actuation means. The feedback means generates the correction signal in response to movement of the actuation output point.

According to another aspect of the present invention, there is provided an actuator for moving a probe in a first direction in response to a number of simultaneously occurring drive signals. The actuator includes an integral strip of piezoelectric material, a first conductive plate extending along a first side of the integral strip of piezoelectric material, and a segmented second conductive plate extending along a side of the piezoelectric material opposite the first side. The segmented second conductive plate is divided transversely into a number of plate segments, with each of the drive signals being applied to a corresponding plate segment. The actuator is clamped at its proximal end, and the probe is attached to a distal end of the actuator.

DESCRIPTION OF THE INVENTION

Figure 1:
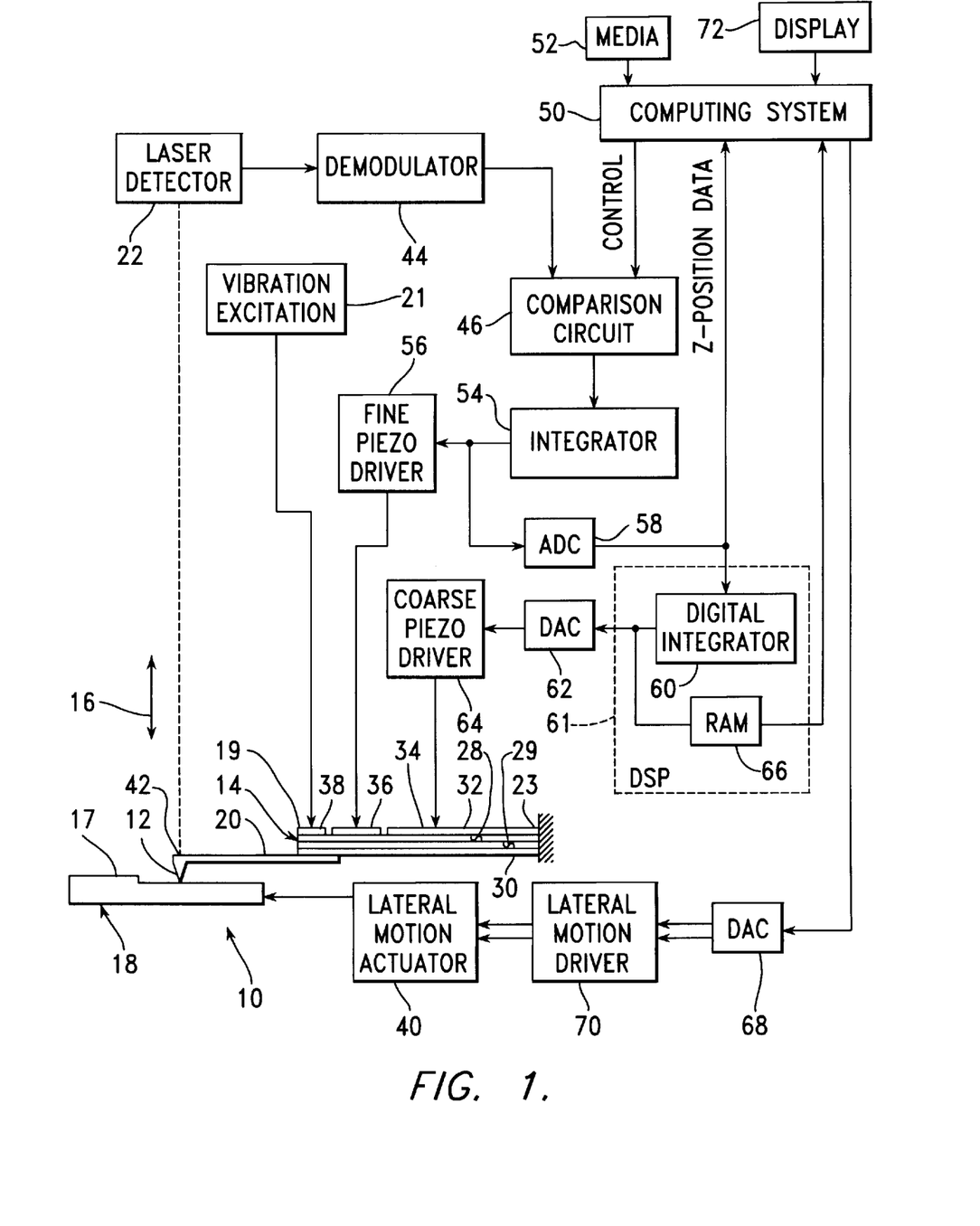
FIG. 1 is a schematic view of apparatus configured for practicing a first mode of the present invention.

FIG. 1 is a schematic view of apparatus configured for practicing a first mode of the present invention. In this apparatus, an atomic force microscope, generally indicated as 10, includes a probe tip 12 moved, by means of a bimorph piezoelectric actuator 14, in the directions indicated by arrow 16, into an increasing or decreasing level of engagement with the upper surface 17 of a sample 18 to be inspected. The probe tip 12 is attached to the distal end 19 of the actuator 14 by means of a flexible cantilever 20. The sample 18 is traversed in a lateral scanning motion generally parallel to its upper surface 17 and perpendicular to the directions of arrow 16. In this mode of operation, a vibration at a pre-determined amplitude and frequency is applied to the piezoelectric actuator 14 in the directions of arrow 16, by means of a vibration excitation driver 21. The frequency of vibration is preferably at the resonant frequency of the cantilever 20, which is typically between 100 KHz and 1 MHz. The resulting motion of the probe tip 12 at this frequency is measured by a laser detector 22, which uses laser heterodyne interferometry to develop an output signal indicating the movement of the probe 12.

In the absence of a system controlling the normal force between the probe tip 12 and the sample surface 17, as this normal force is increased, the amplitude of vibrations at the tip 12 decreases. As this normal force is decreased, this amplitude increases, up to an amplitude occurring with free vibration of the probe tip 12 in an absence of contact with the sample surface 17. In a useful range of engagement between the tip 12 and the surface 17, this effect is due to short range repulsive forces acting between the tip 12 and the surface 17.

The segmented piezoelectric actuator 14 is preferably used as a part of a servo mechanism to maintain a constant amplitude of vibration of the probe tip 12 while it is in engagement with the sample surface 17. With lateral scanning movement of the sample surface 17 relative to the probe tip, the changes in the topography of the sample surface tend to change the distance between the probe tip 12 and the sample surface 17. When a decreased level of such vibrations is detected by the laser detector 22, the actuator 14 is operated to raise its distal end 19, so that the distance between the probe tip 12 and the sample surface is increased, allowing the amplitude of vibration of the probe tip 12 to return to its normal level. When an increased level of such vibrations is detected, the actuator 14 is operated to lower its distal end 19, so that the amplitude of such vibrations is decreased to its normal level.

The proximal end 23 of the actuator 14 is rigidly clamped. The bimorph actuator 14 includes an upper layer 28 of piezoelectric material and a lower layer 29 of a different piezoelectric material extending between a lower electrode 30, which is connected to electrical ground or to a pre-determined voltage, and a segmented upper electrode 32, having individual segments to which various driving voltage signals are applied. These segments are configured to provide varying levels of deflection per volt of the applied signals.

When a single, unsegmented piezoelectric actuator is clamped at its proximal end, the piezo constant, or deflection per applied volt available at the distal end is a function of the length of the actuator. For a given driving voltage range, and a specific type of analog to digital convertor, the bit resolution (i.e. the number of Angstroms of deflection represented by a single bit when the voltage signal applied to the actuator is encoded into a digital signal) is inversely proportional to the piezo constant. The effective deflection of the probe per volt is also affected by the distance between the distal end of the actuator and the probe being moved thereby.

In accordance with this version of the present invention, the segmented piezoelectric actuator 14 includes a coarse actuator segment 34 extending from its proximal end 23, an intermediately-placed fine actuator segment 36, and an excitation actuator segment 38 extending from its distal end 19. These segments are formed by breaks in the upper electrode 32, under which the piezoelectric strips 28, 29 and the lower electrode 30 preferably extend continuously. Of these segments the coarse actuator segment 34 produces the greatest deflection per volt of applied signal because it is the longest segment and because it is the segment having its distal end farthest from the probe tip 12. The excitation actuator segment 38, which is driven to produce vibrations by means of the vibration excitation driver 21, produces the least deflection per volt, since it is the shortest segment, and since its distal end is closest to the probe 12.

For example, both the coarse actuator segment 34 and the fine actuator segment 36 may be operated using driving signals having a total operating range of 70 volts, with the course actuator 34 being a PZT5 bimorph piezoelectric actuator having a length of 5 mm, providing a deflection range of about 3 microns, with a piezo constant of about 400 Angstroms per volt. When this actuator is driven using a voltage derived from a 16-bit digital signal, the bit resolution is about 0.5 Angstrom per bit. Thus, while the course actuator segment 34 of this example produces enough deflection for many applications, its bit resolution is not sufficient for accurate sub-Angstrom imaging. On the other hand, when the fine actuator segment 36 is similarly constructed to have a length of 1 mm, it produces a total deflection range of about 0.3 microns, with a bit resolution of about 0.05 Angstrom per volt. The fine actuator segment 36 is thus suitable for examining structures of the sample surface 17 with a sub-Angstrom resolution.

With the atomic force microscope 10 in operation, the sample 18 is driven in a scanning motion perpendicular to the engagement direction of arrow 16, by means of a lateral motion actuators 40. During the process of testing the sample surface 17, the sample 18 is typically driven in a sawtooth pattern in X- and Y-directions perpendicular to one another, so that the surface 17 is traversed by the probe 12. As the sample 18 is moved in this way, the probe 12, being held in contact with the sample surface 17 as described above, moves in the engagement directions of arrow 16 in response to variations in the topography of the sample surface 17. This movement of the probe 12 is tracked by a laser detector 22, which uses an interferometer to compare a laser beam leaving the detector 22 with a reflection of this laser beam from a reflective surface 42 moving with this probe. The laser detector 22 produces a motion signal describing the movement of the probe 12, which is provided as an input signal to a demodulator 44. Within the demodulator 44, this motion signal is demodulated to produce a feedback signal proportional to the amplitude of the vibration of the probe 12.

While the above discussion considers the sample 18 as being moved by the lateral motion actuator, it is understood that relative motion between the sample 18 and the probe tip 12 is that which is needed. Similar results can be obtained by holding the sample 18 still while the probe tip is moved in a lateral scanning motion perpendicular to the directions of arrow 16.

U.S. Pat. No. 5,186,041 describes in detail a double axis heterodyne interferometer, for measuring the movement of a probe in two axes perpendicular to one another. A portion of this device may be applied to measure the movement of the probe in the present invention along a single axis, in the directions of arrow 16.

To move actuator 14 in the engagement and disengagement directions of arrow 16, as required to correct for topographical features of the sample surface 17, a comparator 46 produces a correction signal having a value derived from the difference between the output of demodulator 44 and a control signal providing a setpoint level from computing system 50, which is running a computer program controlling operation of the atomic force microscope 10. This program is loaded into the computing system 50 by means of one or more computer readable media 52, such as magnetic disks. This setpoint level determines the vibration amplitude at which the probe tip 12 is operated. The correction signal provided as the output of comparison circuit 46 is applied as an input to an integrator 54, which is used to cause the cancellation of small errors occurring rapidly in opposite directions in this correction signal. The output of integrator 54 is provided as an input to both a fine piezo driver 56 and to an analog-to-digital convertor 58. The fine piezo driver 56 provides relatively rapid, short movements of the segmented actuator 14 by applying a voltage signal to the fine actuator segment 34.

Thus, while the total correction signal, including both coarse and fine portions thereof, is applied to the fine piezo driver 56 through integrator 54, the coarse piezo driver 64 operates to compensate for slowly-occurring movements of the probe tip 12. As these "coarse," or slowly-occurring movements are thus removed from the movements for which the fine piezo driver must compensate, the fine piezo driver compensates for only the "fine," or rapidly-occurring movements.

The output of analog-to-digital convertor 58 is applied as a digital input signal both to the computing system 50 and to a digital integrator 60 within a digital signal processor 61. Within the computing system 50, this digital signal from analog-to-digital convertor 58 is used to describe the deflection of the actuator 14 due to the signal applied to the fine actuator segment 34. The digital integrator 60 is programmed with a very large time constant, so that only the very slowly varying components of the output of integrator 54 are passed through along to drive a digital-to-analog convertor 62, which produces an analog signal input to the coarse piezo driver 64. The output voltage signal of coarse piezo driver 64 produces relatively slowly occurring movements of the actuator 14 by driving the coarse actuator segment 34. The output of digital integrator 60 is also provided as an input to a random-access memory 66 within the digital signal processor 61. At various intervals, this data stored within the memory 66 is sent to the computing system 50, in which it is used to determine the deflection of the actuator 14 due to the application of a voltage signal to the coarse actuator segment 34.

The computing system 50 also provides a digital signal to a digital-to-analog convertor 68, in which this signal is decoded to form a pair of analog signals, generating the X- and Y-direction drive signals applied as inputs to lateral motion drivers 70. These drivers 70 generate the voltage signals operating lateral motion actuators 40 to cause the movement of the sample 18 in the X- and Y-directions perpendicular to the directions of arrow 16.

The computing system 50 develops sample height topography data from calculations based on the data supplied by analog-to-digital convertor 58 and by memory 66. The location of various data points, for which height data is calculated, are determined from the digital signal used to drive the digital-to-analog convertor 68. A well-known graphical technique is used to display the height data as a function of the location data on a display unit 72. This output data may also be stored within the computing system 50 or transmitted therefrom.

A particular advantage of the present invention arises from the fact that the coarse and fine motions of the actuator segments 34, 36, are driven by separate signals, so that the position data provided as an output of the system is also derived separately. The coarse movement may occur over a range several orders of magnitude greater than the range of the fine movement. Often, the coarse movement results simply from undulations in the sample surface 17, or from an out of parallel condition between sample surface 17 and the direction in which the sample 18 is driven by lateral motion actuator 40, while the fine movement results from structural variations within the sample surface 17. Such structural variations are typically the subject of an investigation using the atomic force microscope 10. With the present invention, large coarse movements are facilitated without compromising the resolution or accuracy of the data representing fine movements.

Continuing to refer to FIG. 1, and referring additionally to FIGS. 2–7, FIGS. 2–7 provide exemplary graphical views of the movements of the coarse actuator segment 34 and the fine actuator segment 36 in response to the movement of probe tip 12.

Figure 2:
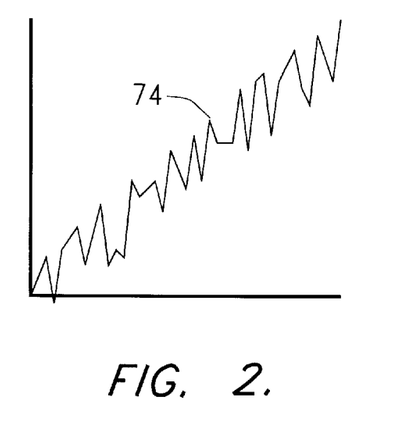
FIG. 2 is a graphical view a first example of probe movement within the apparatus of FIG. 1.
Figure 3:
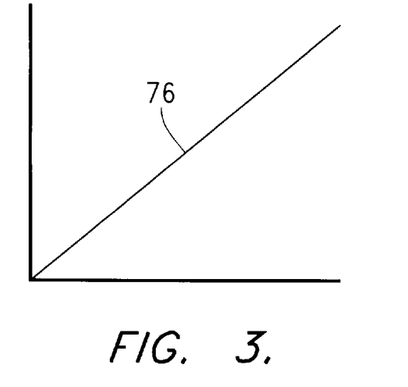
FIG. 3 is a graphical view of movement of a coarse actuator segment in the apparatus of FIG. 1 in response to the probe movement of FIG. 2.
Figure 4:
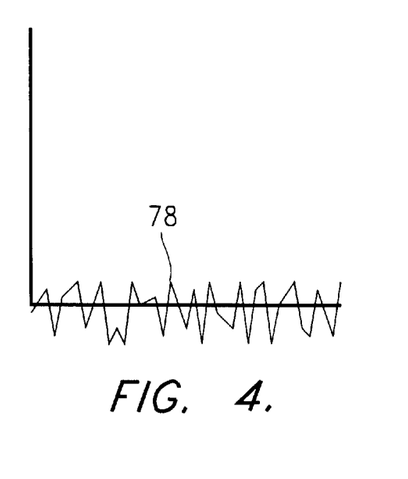
FIG. 4 is a graphical view of movement of a fine actuator segment in the apparatus of FIG. 1 in response to the probe movement of FIG. 2.

FIG. 2 shows, as a function of time, the vertical movement 74 of the probe tip 12 as a result of the topography of the sample surface 17. FIG. 3 shows, again as a function of time, the slow vertical movement 76 of the actuator 14, resulting from the movement of coarse actuator segment 34 in response to the probe tip movement 74 of FIG. 2. FIG. 4 shows, again as a function of time, the rapid vertical movement 78 of actuator 14 resulting from the movement of fine actuator segment 36 in response to the probe tip motion of FIG. 2. In this example, the slow movement 76 of FIG. 3 is simply motion up a slowly rising slope. Because this portion of the total movement 74 shown in FIG. 1 is taken care of by the coarse actuator segment 34, the fine actuator segment 36 operates only to compensate for the remaining, rapidly occurring portion 78 of the movement, as shown in FIG. 4.

Figure 5:
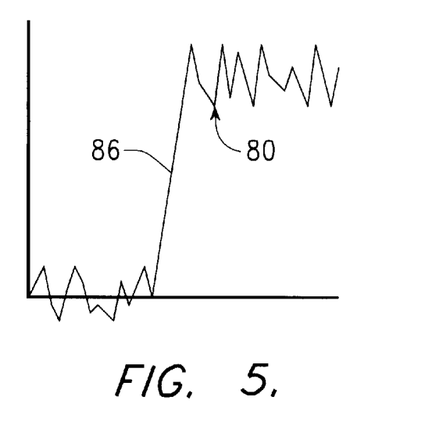
FIG. 5 is a graphical view a second example of probe movement within the apparatus of FIG. 1.
Figure 6:
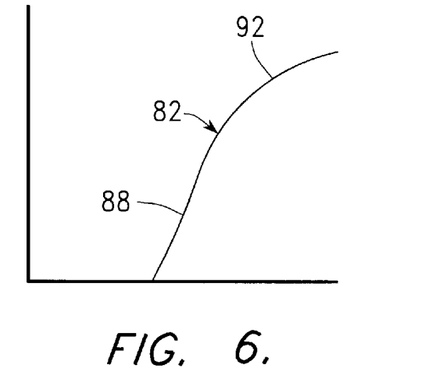
FIG. 6 is a graphical view of movement of a coarse actuator segment in the apparatus of FIG. 1 in response to the probe movement of FIG. 5.
Figure 7:
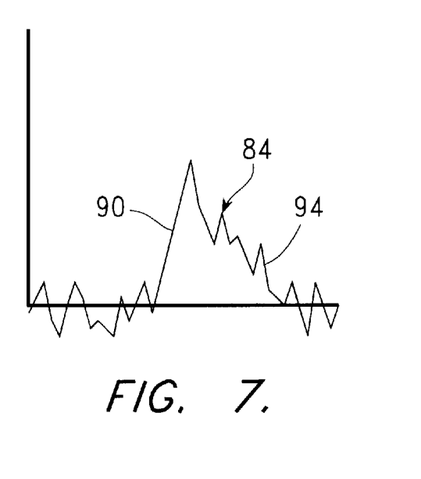
FIG. 7 is a graphical view of movement of a fine actuator segment in the apparatus of FIG. 1 in response to the probe movement of FIG. 5.

FIG. 5 shows a second example 80 of the vertical movement of probe tip 12 resulting from the topographical features of the sample surface 17. FIG. 6 shows the slow movement 82 of the actuator 14, resulting from the movement of coarse actuator segment 34 in response to the probe tip movement 80 of FIG. 5. FIG. 7 shows the rapid vertical movement 84 of actuator 14, resulting from the movement of the fine actuator segment 36. In this example, the probe movement includes a rapid, relatively long rise 86 extending between two levels. Since the coarse actuator segment 34 cannot move rapidly enough, as shown by the corresponding curve segment 88, to follow accurately the rapidly-rising portion 86 of this probe motion, the coarse actuator segment 34 and the fine actuator segment 36, as shown in a corresponding curve portion 90, move together during this part of the motion. Following this rise, the coarse actuator segment 34 continues to move the actuator 14 upward, as shown by the curve portion 92, while the fine actuator segment 36 is returned to operate about the center of its operating range, as shown by the curve portion 94.

Figures 8, 8A:
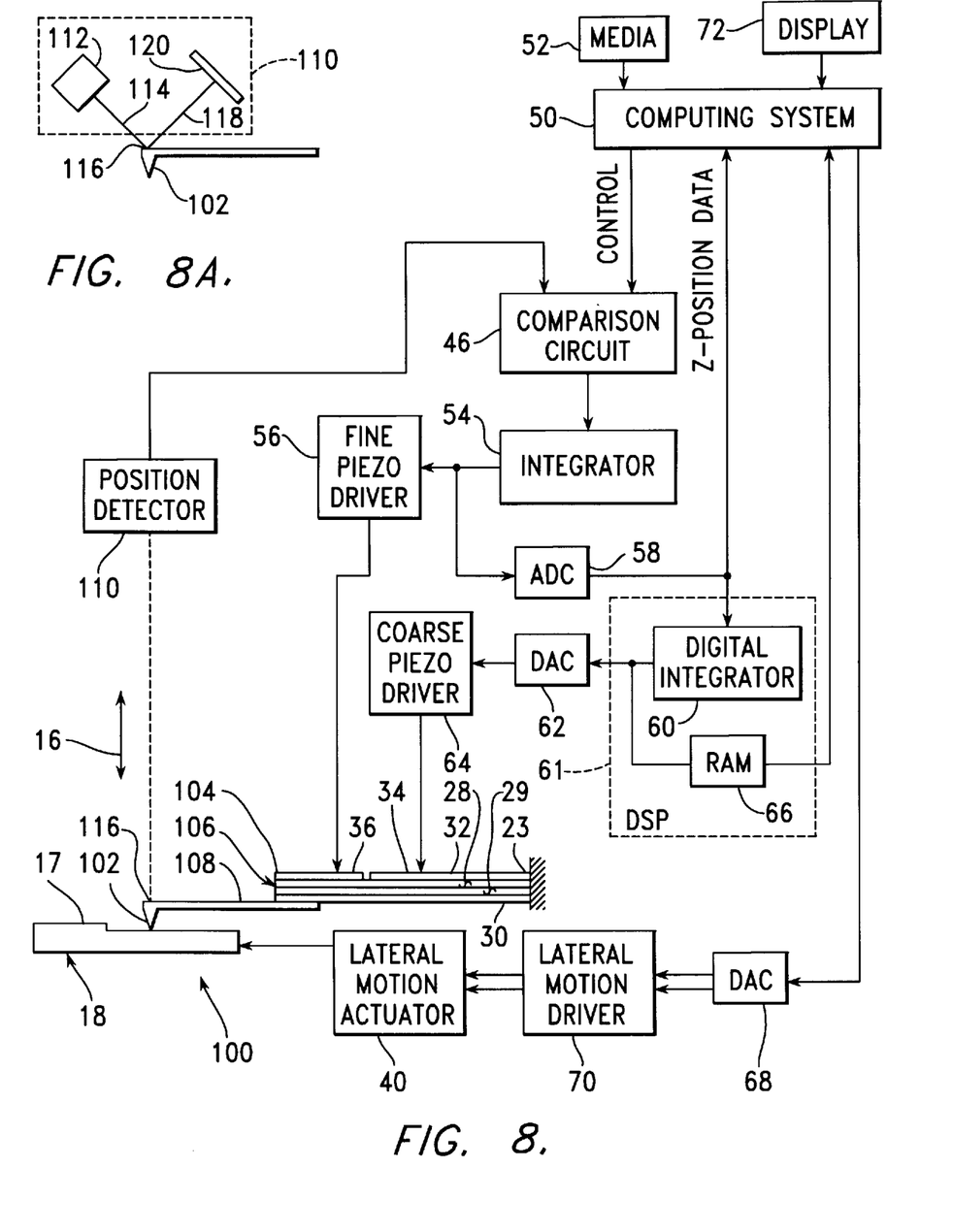
FIG. 8 is a schematic view of apparatus configured for practicing a second mode of the present invention.
FIG. 8A is a schematic view of a position detector used in a first version of the apparatus of FIG. 8.

FIG. 8 is a schematic view of apparatus for practicing a second mode of the present invention. This apparatus includes a scanning probe microscope 100 having a probe tip 102 attached to the distal end 106 of a segmented bimorph piezoelectric actuator 106 by means of a cantilever 108. The vibration excitation discussed above in reference to FIG. 1 is not applied to the actuator 106, which therefore includes only a course segment 34 and a fine segment 36. The laser detector 22 discussed above in reference to FIG. 1 is replaced by a position detector 110, which detects the position of the probe tip 102 as it moves in response to topographical variations in the upper surface 17 of the sample 18 being tested. The position detector 110 produces an output signal describing the vertical position of the probe point 102, which is applied directly as an input to the comparison circuit 46. Other elements of this apparatus are generally as described above in reference to FIG. 1, and are therefore indicated by like reference numerals.

FIG. 8A is a schematic view of the position detector 110 used in a first version of the apparatus of FIG. 8. A laser source 112 directs a laser beam 114 at an oblique angle of incidence toward a reflective surface 116 moving with the probe tip 102. The reflection 118 of this laser beam 114 is directed toward a linear array 120 of photosensitive elements. Vertical movement of the reflective surface 116, in the directions of arrow 16, moves the reflected beam 118 along the array 120, so that the position of the illuminated element within the array 120 determines the vertical position of the probe 102.

Referring again to FIG. 8, in this first version of the apparatus of FIG. 8, the scanning probe microscope 100 is a contact version of an atomic force microscope. An output signal from the position detector 110 is provided as an input to the comparison circuit 46, which in turn provides an output signal to the integrator 54, so that the deflection of actuator 106 is determined by the measured deflection of the probe tip 102. In computing system 50, a control signal applied as an input to comparator 46 has a value calculated by subtracting a pre-determined displacement value from position output data representing the position of the distal end 104 of actuator 106. This position output data determined as described above in reference to FIG. 1 from the signals driving the fine piezo driver 56 and the coarse piezo driver 64. In this way, the correction signal generated as an output of comparison circuit 46 represents the position to which the actuator 106 should be driven to provide the pre-determined level of deflection in the cantilever 108. When this level of deflection is maintained at a constant value, a constant level of normal force is maintained between the probe tip 102 and sample surface 17.

In a second version of the apparatus of FIG. 8, the scanning probe microscope 100 is a scanning tunneling microscope using the measurement technology described in detail in U.S. Pat. No. 4,343,993. In this version of the apparatus, the cantilever 20 is electrically insulating and is quite stiff, so that the deflection of the distal end 104 of the actuator 106 determines the deflection of the probe 102. The position detector 110, which includes a first electrical connection to the sample 18 and a second electrical connection to the probe tip 102, is used to measure a tunneling current flowing between the sample 18 and the probe tip 102. The output of the position detector 110 is a signal representing the value of this tunneling current. The control signal from computing system 50, provided as an input to comparator 46 determines a constant tunneling current at which the microscope is operated.

In both the first and second versions of the apparatus of FIG. 8, the course actuator segment 32 and the fine actuator 36 are operated in the manner previously discussed in reference to FIG. 1, so that the distal end 104 of the actuator 106 is moved in accordance with variations in the output of comparison circuit 46.

While the preceding discussion has described embodiments of the present invention using a segmented cantilever bimorph piezoelectric actuator, the present invention may alternately be practiced using a vertical actuator constructed in a number of different ways. Such an alternative actuator preferably includes a coarse segment, which is particularly adept at responding to a requirement for relatively slow and relatively large movements, and a fine segments, which is particularly adept at responding to a requirement for relatively fast and relatively small movements. The piezoelectric material within the actuator may extend between and through the segments, or the segments may be separate entities, mechanically coupled to provide an output which is the sum of their respective movements.

Figure 9:
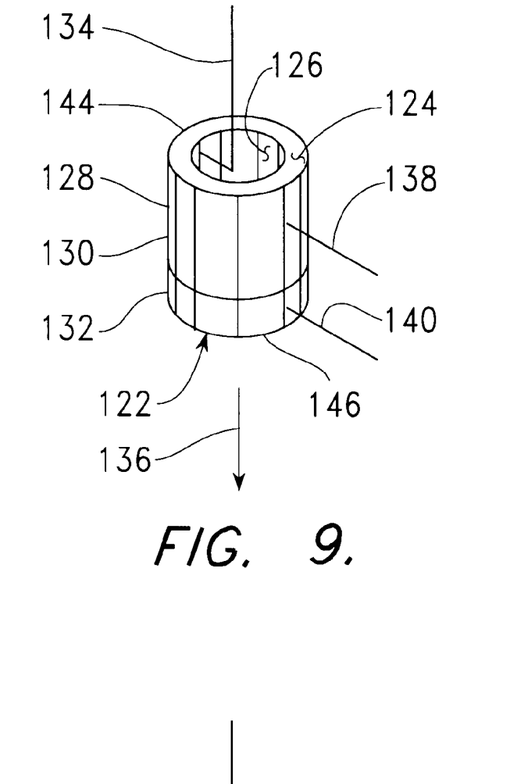
FIG. 9 is an isometric view of a segmented tubular actuator which may be used in the apparatus of FIGS. 1 and 8.

FIG. 9 is an isometric view of a segmented tubular actuator 122, which includes a tubular section 124 of piezoelectric material having an inner electrode 126, extending as a conductive surface around its inner surface, and an outer electrode 128 made up of an upper electrode segment 130 and a lower electrode segment 132. Each of these electrode segments 130, 132 extends entirely around the tubular section 124. With the inner electrode 126 electrically grounded through a wire 134, the application of a voltage to either of the outer electrode segments 130, 132 causes the actuator 122 to elongate in the direction of arrow 136. Since the upper segment of the actuator 122, as defined by the extent of upper electrode segment 120, is much longer than the lower segment, as defined by the extent of lower electrode segment 132, the upper actuator segment produces a larger deflection per volt of applied signal.

Referring to FIGS. 8 and 9, the segmented tubular actuator 122 can be used in place of the segmented bimorph actuator 106 in the version of the present invention shown in FIG. 8, with the output of the coarse piezo driver 64 being applied to upper electrode segment 130 along a wire 138, and with the output of the fine piezo driver 56 being applied to lower electrode segment 132 along a wire 140. In this arrangement, a proximal end 142 of the actuator 122 is clamped, while the probe tip 102 is attached to the distal end 144 of the actuator 122 by means of the cantilever 108.

Similarly, referring to FIGS. 1 and 9, the segmented bimorph actuator 14 of FIG. 1 may be replaced by a version of the segmented tubular actuator 122 having an additional outer electrode segment (not shown) to which the output signal of vibration excitation circuit 21 is applied.

Figure 10:
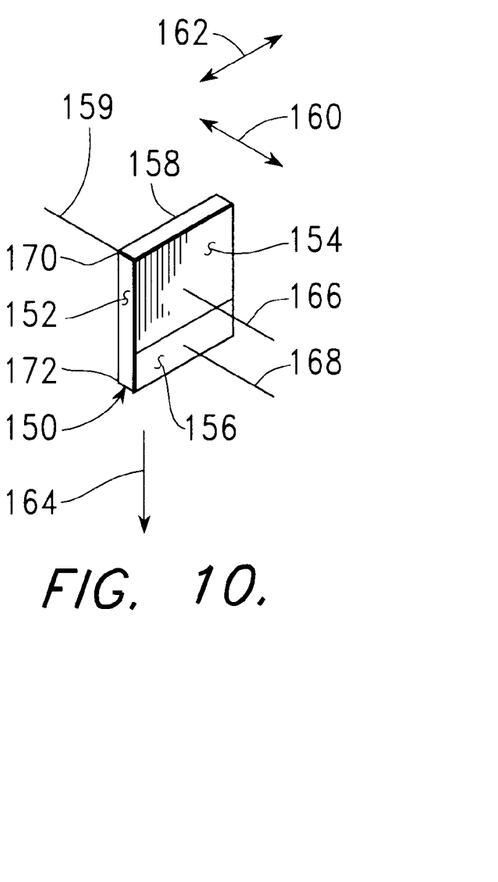
FIG. 10 is an isometric view of a segmented bar actuator which may be used in the apparatus of FIGS. 1 and 8.

FIG. 10 is an isometric view of a segmented piezoelectric bar actuator 150 including a rectangular slab 152 of piezoelectric material. An upper electrode 154 and a lower electrode 154 extend along upper and lower portions, respectively, of the rectangular slab 152 of piezoelectric material, while a rear electrode 158 extends entirely along the opposite side of the slab 152. With the rear electrode 158 electrically grounded through a wire 159, the application of a voltage to either upper electrode 154 or lower electrode 156 causes the corresponding portion (upper or lower) of the piezoelectric material 152 to compress in the Y-direction of arrow 160 and to elongate in both the X-direction of arrow 162, and to expand in the Z-direction of arrow 164. Since the upper electrode 154 is significantly longer than the lower electrode 156, the upper electrode 154 produces a greater movement per volt of applied signal in the Z-direction.

Thus, referring to FIGS. 8 and 10, the segmented bar actuator 150 can be used in place of the segmented bimorph actuator 106 in the version of the present invention shown in FIG. 8, with the output of the coarse piezo driver 64 being applied to upper electrode segment 154 along a wire 166, and with the output of the fine piezo driver 56 being applied to lower electrode segment 156 along a wire 168. In this arrangement, a proximal end 170 of the actuator 150 is clamped, while the probe tip 102 is attached to a distal end 172 of the actuator 150 by means of the cantilever 108.

Similarly, referring to FIGS. 1 and 10, the segmented bimorph actuator 14 of FIG. 1 may be replaced by a version of the segmented bar actuator 150 having an additional outer electrode segment (not shown) to which the output signal of vibration excitation circuit 21 is applied.

A potential problem of the devices of FIGS. 9 and 10, is caused by varying strain conditions between the upper and lower actuator segments as differing signals are applied to these segments. In the device of FIG. 9, the application of a signal to an electrode segment 130 or 132 results in changes to the radial shape of the underlying portion of the piezoelectric tube 124, as well as in changes to its length in the direction of arrow 136. Similarly, in the device of FIG. 10, the application of a signal to an electrode segment 154 or 156 results in dimensional changes of the underlying piezoelectric material 152 in the directions of arrows 160 and 162, as well as an elongation in the direction of arrow 164. In each case, these effects result in variation of the cross-sectional shapes between the upper and lower segments of the actuator. Depending on various physical considerations, such as the shape of the actuator and the amount of deflection required, these effects may be handled by deflection of the piezoelectric material around the interface between the upper and lower segments. Under other conditions, these effects may result in an undesirable interdependence between the deflections produced by the upper and lower actuator segments, or even in structural failure of the actuator.

These effects of incompatible strain conditions between actuator segments may be alleviated through the alternative use of the segmented bimorph piezoelectric actuators 14, 106 described in reference to FIGS. 1 and 8. These actuators 14, 106 produce relatively large deflections in a longitudinal plane with relatively small deflections in a transverse plane, giving rise to a significant advantage of this type of actuator over prior art devices.

Figure 11:
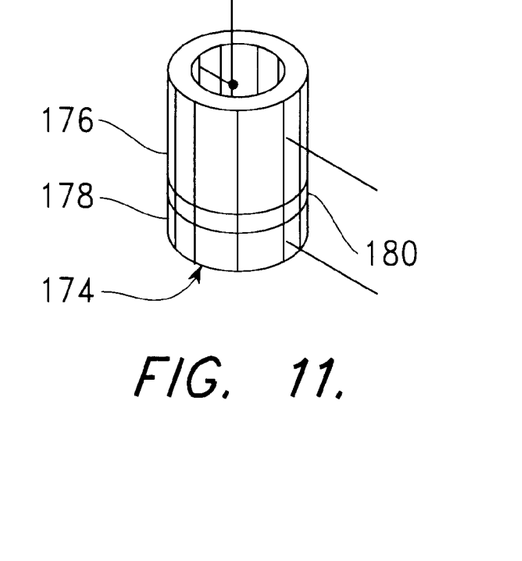
FIG. 11 is an isometric view of an alternative tubular actuator which may be used in the apparatus of FIGS. 1 and 8.
Figure 12:
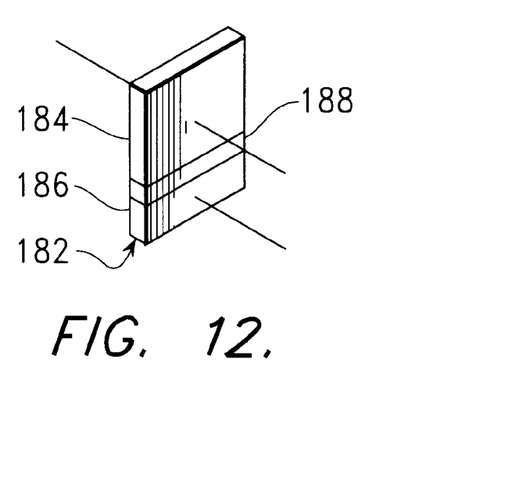
FIG. 12 is an isometric view of an alternative bar actuator which may be used in the apparatus of FIGS. 1 and 8.

These effects of incompatible strain conditions are alternately alleviated through the separation of the actuator segments as shown in FIGS. 11 and 12. Referring first to FIG. 11, an alternative tubular actuator 174 includes an upper segment 176 and a lower segment 178, which are separate devices connected by a flexible coupling 180. Thus, the piezoelectric tube 182 and inner electrode 184 of the upper segment 176 do not extend through the flexible coupling 180. Referring to FIG. 12, an alternative bar actuator 182 includes an upper segment 184 and a lower segment 186, which are separate devices connected by a flexible coupling 188. These actuators 174,186 are used in the manner described above in reference to the actuator 122 of FIG. 9 and the actuator 150 of FIG. 10.

While the invention has been described in its preferred forms or embodiments with some degree of particularity, it is understood that this description has been given only by way of example and that numerous changes in the details of construction, fabrication and use, including the combination and arrangement of parts, may be made without departing from the spirit and scope of the invention.

What is claimed is:

1. Apparatus comprising:
    a probe tip attached to an actuation output point by coupling means, with said probe tip being moved in a first direction by topographical features of a surface of a sample in engagement with said probe tip as said sample is moved in a lateral direction perpendicular to said first direction;
    feedback means generating a correction signal in response to movement of said probe tip as said sample is moved in said lateral direction;
    signal processing means forming a coarse drive signal by integrating said correction signal as said sample is moved in said lateral direction;
    coarse actuation means driven in response to said coarse drive signal as said sample is moved in said lateral direction; and
    fine actuation means driven in response to said correction signal as said sample is moved in said lateral direction, with said actuation output point being moved in said first direction in response to a sum of motion of said coarse and fine actuation means, with said coarse actuation means moving said actuation output point through a greater distance range than said fine actuation means.

2. The apparatus of claim 1, wherein said feedback means includes:
    a detector generating a feedback signal responsive to movement of said probe tip in engagement with said surface of said sample; and
    a comparison circuit generating said correction signal as a difference between said feedback signal and a control signal.

3. The apparatus of claim 2, additionally comprising data processing means providing output data representing movement of said probe tip in said first direction, with said output data being generated from a first set of data representing movement of said coarse actuation means and a second set of data representing movement of said fine actuation means.

4. The apparatus of claim 3, wherein said first set of data is generated from said coarse drive signal, and said second set of data is generated from said correction signal.

5. The apparatus of claim 3, wherein
said coupling means includes a flexible member extending between said actuation output point and said probe tip,
said detector generates said feedback signal corresponding to movement of said probe tip, and
said control signal is a difference between said output data and a setpoint value representing a pre-determined deflection of said flexible member.

6. The apparatus of claim 2, wherein
said apparatus additionally comprises vibration excitation means causing said actuation output point to vibrate in said first direction at a predetermined frequency,
said coupling means includes a flexible member extending between said actuation output point and said probe tip,
said detector includes a position detector generating a position signal corresponding to a position of said probe tip and a demodulator generating said feedback signal corresponding to a vibration amplitude of said position signal, and
said control signal is a setpoint signal representative of a predetermined vibration amplitude.

7. The apparatus of claim 2, wherein
said coupling means includes a rigid insulating member extending between said actuation output point and said probe tip,
said detector generates said feedback signal corresponding to a tunneling current flowing between said sample surface and said probe tip, and
said control signal is a setpoint signal representative of a predetermined level of tunneling current.

8. The apparatus of claim 2, wherein
said coarse actuation means includes a coarse actuator segment of a segmented bimorph piezoelectric actuator,
said fine actuation means includes a fine actuator segment of said segmented bimorph piezoelectric actuator, with said segmented bimorph piezoelectric actuator including first and second piezoelectric strips extending between a first conductive electrode and a segmented second conductive electrode, with said segmented second conductive electrode being divided transversely into a coarse segment to which a first voltage corresponding to said coarse drive signal is applied and a fine segment to which a second voltage corresponding to said correction signal is applied,
said segmented bimorph piezoelectric actuator is rigidly mounted at a proximal end thereof, and
said actuation output point is at a distal end of said segmented bimorph piezoelectric actuator.

9. The apparatus of claim 8, wherein said apparatus additionally comprises a vibration excitation circuit causing said actuation output point to vibrate in said first direction at a pre-determined frequency, with said segmented second conductive electrode being additionally divided into an excitation segment to which a signal from said vibration excitation circuit is applied.

10. Apparatus for measuring and displaying topographical features of a surface of a sample, wherein said apparatus comprises:

a probe tip movable in a first direction perpendicular to said surface of said sample, being moved in said first direction by topographical features thereof;
lateral drive means generating relative motion between said sample and said probe tip in a scanning direction perpendicular to said first direction;
a detector generating a feedback signal representative of movement of said probe tip in said first direction in engagement with said surface of said sample occurring as said lateral drive means generates said relative motion;
a comparison circuit generating a correction signal as a difference between said feedback signal and a control signal;
signal processing means forming a coarse drive signal by integrating said correction signal;
coarse actuation means driven in response to said coarse drive signal and;
fine actuation means driven in response to said correction signal, with an actuation output point being moved in a first direction in response to a sum of motion of said coarse and fine actuation means, with said coarse actuation means moving said actuation output point through a greater distance range than said fine actuation means, with said probe tip being attached to said actuation output point by coupling means.

11. The apparatus of claim 10, additionally comprising data processing means providing output data representing movement of said probe tip in said first direction, with said output data being generated from a first set of data representing movement of said coarse actuation means and a second set of data representing movement of said fine actuation means.

12. The apparatus of claim 11, wherein
said first set of data is generated from said coarse drive signal, and
said second set of data is generated from said correction signal.

13. The apparatus of claim 11, wherein
said coupling means includes a flexible member extending between said actuation output point and said probe tip,
said detector generates said feedback signal corresponding to movement of said probe tip, and
said control signal is a difference between said output data and a setpoint value representing a pre-determined deflection of said flexible member.

14. The apparatus of claim 10, wherein
said apparatus additionally comprises vibration excitation means causing said actuation output point to vibrate in said first direction at a predetermined frequency,
said coupling means includes a flexible member extending between said actuation output point and said probe tip,
said detector includes a position detector generating a position signal corresponding to a position of said probe tip and a demodulator generating said feedback signal corresponding to a vibration amplitude of said position signal, and
said control signal is a setpoint signal representative of a predetermined vibration amplitude.

15. The apparatus of claim 10, wherein
said coupling means includes a rigid insulating member extending between said actuation output point and said probe tip, said detector generates said feedback signal corresponding to a tunneling current flowing between said sample surface and said probe tip, and said control signal is a setpoint signal representative of a predetermined level of tunneling current.

16. The apparatus of claim 10, wherein said coarse actuation means includes a coarse actuator segment of a segmented bimorph piezoelectric actuator, said fine actuation means includes a fine actuator segment of said segmented bimorph piezoelectric actuator, with said segmented bimorph piezoelectric actuator including integral piezoelectric material extending between a first conductive plate and a segmented second conductive electrode, with said segmented second conductive electrode being divided transversely into a coarse segment to which a first voltage corresponding to said coarse drive signal is applied and a fine segment to which a second voltage corresponding to said correction signal is applied, said segmented bimorph piezoelectric actuator is rigidly mounted at a proximal end thereof, and said actuation output point is at a distal end of said segmented bimorph piezoelectric actuator.

17. The apparatus of claim 16, wherein said apparatus additionally comprises vibration excitation means causing said actuation output point to vibrate in said first direction at a predetermined frequency, and said segmented second conductive electrode is additionally divided into an excitation segment to which a signal from said vibration excitation means is applied.

* * * * *